US012706970B2

(12) United States Patent
Xue et al.

(10) Patent No.: US 12,706,970 B2
(45) Date of Patent: Aug. 11, 2026

(54) METHOD FOR DETERMINING APPLICATION SERVER AND APPARATUS

(71) Applicant: HUAWEI TECHNOLOGIES CO., LTD., Shenzhen (CN)

(72) Inventors: Yifei Xue, Shanghai (CN); Yan Wang, Shanghai (CN); Weihua Hu, Shenzhen (CN); Hancheng Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 100 days.

(21) Appl. No.: 18/745,885

(22) Filed: Jun. 17, 2024

(65) Prior Publication Data

US 2024/0340707 A1 Oct. 10, 2024

Related U.S. Application Data

(63) Continuation of application No. PCT/CN2022/139487, filed on Dec. 16, 2022.

(30) Foreign Application Priority Data

Dec. 17, 2021 (CN) ........................ 202111552660.7

(51) Int. Cl.
*G06F 15/16* (2006.01)
*H04L 67/1014* (2022.01)
(Continued)

(52) U.S. Cl.
CPC ...... *H04L 67/1021* (2013.01); *H04L 67/1014* (2013.01); *H04W 24/02* (2013.01)

(58) Field of Classification Search
CPC . H04L 67/1021; H04L 67/1014; H04W 24/02
(Continued)

(56) References Cited

U.S. PATENT DOCUMENTS 7,886,023 B1 * 2/2011 Johnson .............. H04L 67/1019 709/219
7,992,152 B2 * 8/2011 Hashimoto ............... G06F 9/50 718/105

(Continued)

FOREIGN PATENT DOCUMENTS

CN 104010290 A 8/2014
CN 106487840 A 3/2017
CN 111800501 A 10/2020

OTHER PUBLICATIONS

3GPP TS 23.548 V17.0.0 (Sep. 2021) 3rd Generation Partnership Project; Technical Specification Group Services and System Aspects;5G System Enhancements for Edge Computing; Stage 2 (Release 17), total 52 pages.

(Continued)

*Primary Examiner* — Alicia Baturay

(57) ABSTRACT

Embodiments of this application provide a method for determining an application server and an apparatus. The method includes: A first network element obtains a characteristic parameter of a candidate application server. The first network element obtains a network status of a serving link, where the serving link is a link from a terminal to a DN in which the candidate application server is located. The first network element determines a target application server from the candidate application server based on the characteristic parameter of the candidate application server and the network status of the serving link. Therefore, compared with an existing method, in the method in this application, resources in a network can be better used, and the selected target application server can better execute a service of the terminal device, to improve user experience.

16 Claims, 2 Drawing Sheets

Method 300

S310: Obtain a characteristic parameter of a candidate application server

S320: Obtain a network status of a serving link

S330: Determine a target application server from the candidate application server based on the characteristic parameter of the candidate application server and the network status of the serving link

(51) Int. Cl.
*H04L 67/1021* (2022.01)
*H04W 24/02* (2009.01)

(58) Field of Classification Search
USPC .......................................................... 709/217
See application file for complete search history.

(56) References Cited

U.S. PATENT DOCUMENTS

| | | | | |
|---|---|---|---|---|
| 11,397,622 | B2 * | 7/2022 | Kiraly | G06F 9/45533 |
| 11,561,815 | B1 * | 1/2023 | Majd | G06F 9/5094 |
| 12,010,167 | B2 * | 6/2024 | Kumar | G06F 9/5061 |
| 2007/0208874 | A1 | 9/2007 | Previdi et al. | |
| 2007/0209051 | A1 * | 9/2007 | Xu | H04H 20/26<br>725/63 |
| 2011/0314158 | A1 | 12/2011 | Soejima | |
| 2024/0023296 | A1 * | 1/2024 | Lei | G06F 1/206 |
| 2024/0430321 | A1 * | 12/2024 | Kobayashi | H04L 67/1008 |
| 2025/0142523 | A1 * | 5/2025 | Choi | H04W 48/20 |
| 2025/0335246 | A1 * | 10/2025 | He | G06F 9/5088 |

OTHER PUBLICATIONS

Yao Huijuan et al.; “Computing Power Awareness Network Technical White Paper”,2019, with English translation total 61 pages.

* cited by examiner

METHOD FOR DETERMINING APPLICATION SERVER AND APPARATUS

CROSS-REFERENCE TO RELATED APPLICATIONS

This application is a continuation of International Application No. PCT/CN2022/139487, filed on Dec. 16, 2022, which claims priority to Chinese Patent Application No. 202111552660.7, filed on Dec. 17, 2021. The disclosures of the aforementioned applications are hereby incorporated by reference in their entireties.

TECHNICAL FIELD

This application relates to the field of communication technologies, and more specifically, to a method for determining an application server and an apparatus.

BACKGROUND

Currently, when an application server is selected for a terminal device, a single selection policy is used, and the application server is usually selected for the terminal device by using a proximity principle. However, the application server selected by using the proximity principle may not be the most appropriate application server. Therefore, how to select an appropriate application server for the terminal device is an urgent problem to be resolved.

SUMMARY

This application provides a method for determining an application server and an apparatus, to select an appropriate application server for a terminal device.

According to a first aspect, a method for determining an application server is provided.

The Method Includes:

A first network element obtains a characteristic parameter of a candidate application server, where the candidate application server is capable of executing a target service of a terminal. The first network element obtains a network status of a serving link, where the serving link is a link from a terminal to a DN in which the candidate application server is located. The first network element determines a target application server from the candidate application server based on the characteristic parameter of the candidate application server and the network status of the serving link, where the target application server is configured to execute the target service.

It should be understood that the first network element may be a session management network element or a newly added network element. For example, the newly added network element may be referred to as a compute service management function (CSMF) network element.

It can be learned from the foregoing that, when selecting an application server for the terminal device, the first network element considers the characteristic parameter of the application server and the network status of the serving link, instead of selecting the application server only according to a proximity principle. Therefore, compared with an existing method, in the method in this application, resources in a network can be better used, and the selected target application server can better execute a service of the terminal device, to improve user experience.

With reference to the first aspect, in some implementations of the first aspect, the characteristic parameter includes an identifier of an application server, an identifier of a service capable of being executed by the application server, and a data network access identifier DNAI of a DN in which the application server is located.

With reference to the first aspect, in some implementations of the first aspect, the characteristic parameter further includes one or more of the following:

a remaining capacity of the application server, task processing efficiency of the application server, task storage efficiency of the application server, a data network name DNN of the DN in which the application server is located, an identifier of an application function network element associated with the application server, a location of the application server, a domain name of a domain to which the application server belongs, and network slice selection assistance information NSSAI of a network slice to which the application server belongs.

With reference to the first aspect, in some implementations of the first aspect, the method further includes:

The first network element sends a first request message to the second network element, where the first request message includes an identifier of the target service, and the first request message is used to request a characteristic parameter of an application server capable of executing the target service. That the first network element obtains a characteristic parameter of a candidate application server includes: The first network element receives a first response message from the second network element, where the first response message includes the characteristic parameter of the candidate application server.

It should be understood that the second network element is configured to store data. For example, the second network element may be an existing data repository network element in a core network system architecture, or the second network element may be a newly added network element.

With reference to the first aspect, in some implementations of the first aspect, the method further includes:

The first network element sends a second request message to a data management network element, where the second request message is used to request service information related to the terminal, and the second request message includes an identifier of the terminal. The first network element receives a second response message from the data management network element, where the second response message includes the identifier of the target service.

With reference to the first aspect, in some implementations of the first aspect, the method further includes: The first network element receives a third request message from a session management network element, where the third request message is used to request the first network element to select an application server for the terminal, and the third request message includes the identifier of the terminal.

With reference to the first aspect, in some implementations of the first aspect, the method further includes:

The first network element obtains the identifier of the target service from a third network element, where the third network element is an edge application server discovery network element or a domain name system DNS server.

With reference to the first aspect, in some implementations of the first aspect, the network status of the serving link includes:

- a status of a network in the DN in which the candidate application server is located, and/or a status of a network between the terminal and an access network device, and/or a status a network between the access network device and a candidate user plane function network element, where the candidate user plane function network element is associated with the DN in which the candidate application server is located.

With reference to the first aspect, in some implementations of the first aspect, that the first network element obtains a network status of a serving link includes:

The first network element obtains locally or from the second network element, the status of the network in the DN in which the candidate application server is located; and/or the first network element obtains the status of the network between the terminal and the access network device from the session management network element; and/or the first network element obtains the status of the network between the access network device and the candidate user plane function network element from the session management network element.

With reference to the first aspect, in some implementations of the first aspect, the method further includes:

The first network element sends an identifier of the target application server, the identifier of the terminal, and the identifier of the target service to the session management network element.

With reference to the first aspect, in some implementations of the first aspect, that the first network element obtains a network status of a serving link includes:

The first network element obtains the status of the network between the terminal and the access network device from a user plane function network element accessed by the terminal; and/or the first network element obtains the status of the network between the access network device and the candidate user plane function network element from the candidate user plane function network element.

With reference to the first aspect, in some implementations of the first aspect, the method further includes:

The first network element sends an identifier of the target application server, the identifier of the terminal, and the identifier of the target service to the edge application server discovery network element.

According to a second aspect, a first network element is provided. The first network element includes a unit configured to perform the method according to any one of the first aspect and the implementations of the first aspect.

According to a third aspect, a communication device is provided, including a communication interface and a processor. When the communication device runs, the processor executes a computer program or instructions stored in a memory, so that the communication device performs the method according to any implementation of the first aspect. The memory may be located in the processor, or may be implemented by using a chip independent of the processor. This is not limited in this application.

According to a fourth aspect, a computer-readable storage medium is provided, including a computer program. When the computer program is run on a computer, the computer is enabled to perform the method according to any implementation of the first aspect.

According to a fifth aspect, a chip is provided. A processing circuit is disposed on the chip, and the processing circuit is configured to perform the method according to any implementation of the first aspect.

According to a sixth aspect, a computer program product is provided. The computer program product includes a computer program (which may also be referred to as code or instructions). When the computer program is run, a computer is enabled to perform the method according to any implementation of the first aspect.

According to a seventh aspect, a communication system is provided. The communication system includes a first network element and another device that communicates with the first network element. The first network element is configured to perform the method according to any one of the first aspect and the implementations of the first aspect.

DESCRIPTION OF EMBODIMENTS

The following describes technical solutions of embodiments in this application with reference to accompanying drawings.

The technical solutions of embodiments of this application may be applied to various communication systems, such as a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, LTE time division duplex (TDD), a universal mobile telecommunications system (UMTS), a worldwide interoperability for microwave access (WiMAX) communication system, a 5th generation (5G) communication system, a new radio (NR) system, or a future 6th generation (6G) system.

Figure 1:
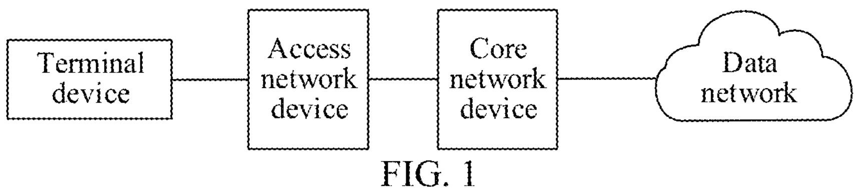
FIG. 1 shows a system architecture to which an embodiment of this application is applicable.

FIG. 1 shows a communication system 100 to which this application is applicable. The communication system 100 includes a terminal device, an access network device, a core network device, and a data network (DN).

The terminal device in embodiments of this application may be a user equipment (UE), an access terminal, a subscriber unit, a subscriber station, a mobile station, a mobile console, a remote station, a remote terminal, a mobile device, a user terminal, a terminal, a wireless communication device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, a terminal device in a future 6G network, a terminal device in a future evolved public land mobile network (PLMN), or the like. This is not limited in embodiments of this application.

The access network device in embodiments of this application may be a device configured to communicate with the terminal device. The access network device may be a base station (BTS) in the global system for mobile communications (GSM) system or the code division multiple access (CDMA) system, may be a NodeB (NB) in the wideband code division multiple access (WCDMA) system, may be an evolved NodeB (eNB or eNodeB) in the LTE system, or may be a radio controller in a cloud radio access network (CRAN) scenario. Alternatively, the access network device may be a relay station, an access point, a vehicle-mounted device, a wearable device, an access network device in the 5G network, an access network device in the future 6G network, an access network device in the future evolved PLMN network, or the like. This is not limited in embodiments of this application.

In embodiments of this application, the core network may include but is not limited to a session management network element, an application function network element, a network exposure network element, a data management network element, a data repository network element, an edge application server discovery network element, and a user plane function network element.

The session management network element is configured to manage, for example, session establishment and deletion of a user, and maintenance of a session context. For example, in the 5G network, the session management network element may be a session management function (SMF) network element. It should be understood that, in a future communication system, the session management network element may still be an SMF network element, or may have another name. This is not limited in this application.

The application function network element is configured to provide various services. For example, in the 5G network, the application function network element may be an application function (AF) network element. It should be understood that, in a future communication system, the application function network element may still be an AF network element, or may have another name. This is not limited in this application.

The network exposure network element is responsible for managing all external applications that expose network data externally, and ensuring security of the external applications to a 3GPP network. For example, in the 5G network, the network exposure network element may be a network exposure function (NEF) network element. It should be understood that, in a future communication system, the network exposure network element may still be an NEF network element, or may have another name. This is not limited in this application.

The data management network element is a network element configured to manage data. For example, in the 5G network, the data management network element may be a unified data management function (UDM) network element. It should be understood that, in a future communication system, the data management network element may still be a UDM network element, or may have another name. This is not limited in this application.

The data repository network element is configured to store and retrieve subscription data, policy data, public architecture data, and the like. For example, in the 5G network, the data repository network element may be a unified data repository (UDR) network element. It should be understood that, in a future communication system, the data repository network element may still be a UDR network element, or may have another name. This is not limited in this application.

The edge application server discovery network element is configured to discover an edge application server. For example, in the 5G network, the edge application server discovery network element may be an edge application server discovery function (EASDF) network element. It should be understood that, in a future communication system, the edge application server discovery network element may still be an EASDF network element, or may have another name. This is not limited in this application.

The user plane function network element is responsible for a user plane function, packet routing and forwarding, policy implementation, traffic reporting, and the like. For example, in the 5G network, the user plane function network element may be a user plane function (UPF) network element. It should be understood that, in a future communication system, the user plane function network element may still be a UPF network element, or may have another name. This is not limited in this application.

Currently, when an application server is selected for a terminal device, a single selection policy is used, and the application server is usually selected for the terminal device by using a proximity principle. However, the application server selected by using the proximity principle may not be the most appropriate application server. For example, a computing capability available to the nearest application server is insufficient, or a storage capacity available to the nearest application server is insufficient, or load of the nearest application server is heavy, or a network status of a link from the terminal device to the nearest application server cannot meet a requirement. In this case, using the nearest application server to execute a service of the terminal device may not meet a requirement of the terminal device, for example, cannot meet a delay requirement, a capacity requirement, or a network status requirement of the terminal device for the service. Based on this, this application provides a method to resolve the foregoing problem.

For ease of description, an example in which the access network device is a RAN, the session management network element is an SMF, the application function network element is an AF, the network exposure network element is an NEF, the data management network element is a UDM, the data repository network element is a UDR, the edge application server discovery network element is an EASDF, and the user plane function network element is a UPF is used below for description.

Figure 2:
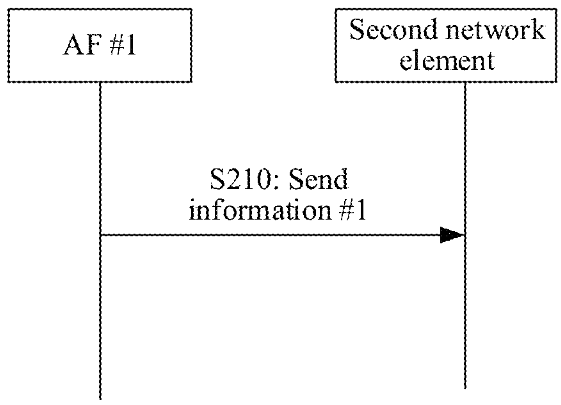
FIG. 2 is a diagram of an example of a method according to this application.

FIG. 2 shows a method 200 according to this application. The method 200 includes the following steps.

S210: An AF #1 sends information #1 to a second network element, where the information #1 includes a characteristic parameter of each of at least one application server associated with the AF #1. Correspondingly, the second network element receives the information #1.

The second network element is configured to store data. For example, the second network element may be an existing UDR network element in a core network system architecture, or the second network element may be a newly added network element in a core network system architecture. In this application, the newly added network element in the core network system architecture is referred to as a compute service management function (CSMF) network element. Certainly, the newly added network element may have another name. This is not limited.

The newly added network element may be configured to store the information #1, or may be configured to perform a related operation of a first network element in the following method 300.

In an embodiment, the AF #1 may send the information #1 to the second network element by using an NEF. Optionally, the NEF may send a response message #1 to the AF #1, and the response message #1 indicates that the information #1 is successfully stored.

Similarly, another AF, for example, an AF #2, may send information #2 to the second network element. The information #2 includes a characteristic parameter of each of at least one application server associated with the AF #2. Correspondingly, the second network element receives the information #2.

The second network element stores information about a characteristic parameter of the at least one application server.

The following describes the characteristic parameter of the application server.

Optionally, the characteristic parameter of the application server includes an identifier of the application server, an identifier of a service (SID) capable of being executed by the application server, and a data network access identifier (DNAI) of a DN in which the application server is located.

In an example, the identifier of the application server may be an internet protocol (IP) address of the application server.

Optionally, the characteristic parameter of the application server further includes one or more of the following:

a remaining capacity of the application server, task processing efficiency of the application server, task storage efficiency of the application server, a data network name (DNN) of the DN in which the application server is located, an identifier of an AF associated with the application server, a location of the application server, a domain to which the application server belongs, and network slice selection assistance information (NSSAI) of a network slice to which the application server belongs.

For example, the remaining capacity of the application server may be indicated by a quantity of connections that are being processed by the application server and a total quantity of connections that can be processed by the application server. For example, if a quantity of connections that are being processed by an application server #1 is 100 and a total quantity of connections that can be processed by the application server is 500, the remaining capacity of the application server is 400.

For example, the task processing efficiency and the task storage efficiency of the application server may be represented by duration in which the application server may be invoked once, for example, maximum duration, a time range, or average duration in which the application server may be invoked once.

It should be understood that the characteristic parameter of the application server may alternatively be another parameter, for example, a quantity of UEs served by the application server. This is not limited in this application.

Figure 3:
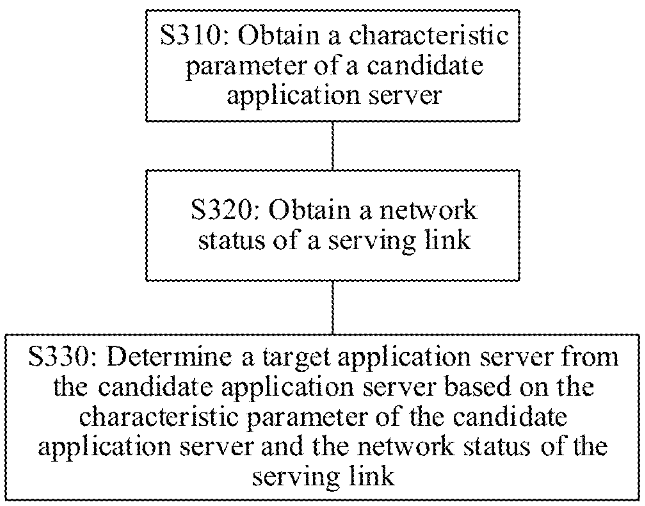
FIG. 3 is a diagram of an example of a method according to this application.

FIG. 3 shows a method 300 according to this application. It should be understood that the method 300 may be performed based on the method 200. The method 300 includes the following steps.

S310: The first network element obtains a characteristic parameter (denoted as first information) of a candidate application server.

The candidate application server can execute a target service of a terminal. In other words, the candidate application server has a capability of executing the target service. The candidate application server includes one or more application servers.

It should be understood that the first network element may be an SMF, a CSMF, or another network element. This is not limited. For ease of description, an example in which the first network element is an SMF or a CSMF is used below for description.

The following describes a manner in which the first network element obtains the first information.

Manner 1:

Manner 1 is applicable to the following two cases:

Case 1: The first network element is an SMF.

Case 2: The first network element is a CSMF, and the second network element in S210 is a UDR.

The first network element may obtain the first information by using the following three steps.

Step 1: The first network element sends a first request message to the second network element in S210, where the first request message includes an identifier of the target service, and the first request message is used to request a characteristic parameter of an application server capable of executing the target service.

Optionally, the first request message further includes one or more of the following:

an identifier of an AF associated with the target service, a DNN of a DN associated with the target service, NSSAI of a network slice associated with the target service, and a domain associated with the target service.

Step 2: The second network element determines the candidate application server from the at least one application server based on the identifier of the target service and the characteristic parameter of the at least one application server that is stored in S210.

For example, if the first request message requests an application server capable of executing a service #1, the second network element queries the at least one application server for the application server capable of executing the service #1.

For another example, if the first request message requests an application server that is capable of executing a service #1 and that is in a DN #1, the second network element queries the at least one application server for the application server that is capable of executing the service #1 and that is in the DN #1.

For another example, if the first request message requests an application server that is capable of executing a service #1 and whose domain name is "aaa.com", the second network element queries the at least one application server for the application server that is capable of executing the service #1 and whose domain name is "aaa.com".

Step 3: The second network element sends a first response message to the first network element, where the first response message includes the first information.

Manner 2:

Manner 2 is applicable to a case in which the first network element is a CSMF and the second network element is also a CSMF. In other words, the first network element and the second network element are a same network element.

In this case, the first network element may obtain the characteristic parameter of the candidate application server from a locally stored characteristic parameter of at least one application server.

S320: The first network element obtains a network status (denoted as second information) of a serving link.

The serving link is a link from the terminal to a DN in which the candidate application server is located.

It should be understood that a parameter representing the network status includes but is not limited to a bandwidth, and/or a delay, and/or a packet loss rate.

The network status of the serving link includes:

a status of a network in the DN in which the candidate application server is located, and/or a status of a network between the terminal and a RAN, and/or a status of a network between the RAN and a candidate UPF.

The RAN is a RAN accessed by the terminal, and the candidate UPF is a UPF associated with the DN in which the candidate application server is located. Details about the RAN and the candidate UPF are not described below.

For example, if the candidate application server includes an application server #1 and an application server #2, a DN in which the application server #1 is located is a DN #1, a DN in which the application server #2 is located is a DN #2, a UPF associated with the DN #1 is a UPF #1, and a UPF associated with the DN #2 is a UPF #2, the candidate UPF includes the UPF #1 and the UPF #2.

In this case, a network status of the serving link #1 includes:

the status of the network between the terminal and the RAN, and/or a status of a network between the RAN and the UPF #1, and/or a status of a network in the DN #1.

A network status of the serving link #2 includes:

the status of the network between the terminal and the RAN, and/or a status of a network between the RAN and the UPF #2, and/or a status of a network in the DN #2.

It can be learned from the foregoing that the network status of the serving link may include three parts. In an example, the network status of the serving link #1 may be calculated by using a formula in the following table. It should be understood that a manner of calculating the network status of the serving link #1 may be the same as a manner of calculating the network status of the serving link #2.

TABLE 1

| | Bandwidth | Delay | Packet loss rate |
|---|---|---|---|
| Terminal to RAN | A | D | G |
| RAN to UPF #1 | B | E | H |
| In DN #1 | C | F | I |
| Serving link #1 | min(A, B, C) | D + E + F | 1 − (1 − G)(1 − H)(1 − I) |

S330: The first network element determines a target application server from the candidate application server based on the characteristic parameter of the candidate application server and the network status of the serving link, where the target application server is configured to execute the target service.

In a manner, the first network element may determine the target application server from the candidate application server based on the first information, the second information, and an application server selection policy applicable to the target service.

In an example, reference computing power of each candidate application server may be calculated by using the following formula #1:

Formula #1: Reference computing power=Coefficient #1×Remaining capacity+Coefficient #2× Processing efficiency+Coefficient #3×Storage efficiency+Coefficient #4×Link bandwidth+Coefficient #5×Link delay+Coefficient #6×Packet loss rate+Coefficient #7×Location The application server selection policy may be used to determine the coefficient #1 to the coefficient #7. In other words, values of the coefficient #1 to the coefficient #7 are associated with the application server selection policy. The application server selection policy may be preconfigured in the first network element. The coefficient #1 to the coefficient #7 may also be preconfigured in the first network element. In other words, different target services may correspond to different coefficients.

Two examples are used for description below.

Example 1

The SID of the target service is an SID #1, and the candidate application server is an application server #1 (whose IP is an IP #1), an application server #2 (whose IP is an IP #2), and an application server #3 (whose IP is an IP #3). An application server selection policy applicable to the SID #1 is proximity and high efficiency. For example, the SID #1 is face detection (face detection). Content included in the first information is shown in Table 2, and content included in the second information is shown in Table 3. The serving link #1 is a link between the terminal and the DN #1, the serving link #2 is a link between the terminal and multi-access edge computing (MEC) #1, and a serving link #3 is a link between the terminal and MEC #2.

It should be understood that the application server #1 is located in the DN #1, the application server #2 is located in the MEC #1, and the application server #3 is located in the MEC #2. In an example, the location parameter may be represented by a distance from the terminal to the application server. For example, the distance is a distance between a geographical location of the terminal and a geographical location of the application server, or may be a length of a communication path for communication between the terminal and the application server. In another example, the location parameter may be represented by using a distance from the RAN to the application server.

TABLE 2

| Service identifier | Application server IP | Remaining capacity | Task processing efficiency | Task storage efficiency | Location | DNAI |
|---|---|---|---|---|---|---|
| SID #1 | IP #1 | 10000/100000 | 10 s | 10 s | DN #1 | DNAI #1 |
| SID #1 | IP #2 | 600/10000 | 10 s | 10 s | MEC #1 | DNAI #2 |
| SID #1 | IP #3 | 600/10000 | 30 s | 10 s | MEC #2 | DNAI #3 |

TABLE 3

| | Bandwidth | Delay | Packet loss rate |
|---|---|---|---|
| Serving link #1 | 500M | 50 ms | 2% |
| Serving link #2 | 400M | 10 ms | 1% |
| Serving link #3 | 500M | 20 ms | 1% |

According to the foregoing formula #1, the first network element determines reference computing power of the application server #1, reference computing power of the application server #2, and reference computing power of the application server #3, and determines that the target application server is an application server with the largest reference computing power in the three application servers. It should be understood that the application server selection policy of the SID #1 is proximity and high efficiency. In this case, weights of the location and the task processing efficiency in the formula #1 may be increased, for example, values of the coefficient #2 and the coefficient #7 are increased. Because the application server #2 (or the MEC #1) is close to the terminal, and task processing efficiency of the application server #2 is relatively high, the first network element calculates that the reference computing power of the application server #2 is the largest, and determines that the target application server is the application server #2.

Example 2

The SID of the target service is an SID #2, and the candidate application server is an application server #4 (whose IP is an IP #4) and an application server #5 (whose IP is an IP #5). An application server selection policy applicable to the SID #2 is that resources are sufficient. For example, the SID #2 is a translation service. Content included in the first information is shown in Table 4, and content included in the second information is shown in Table 5. A serving link #4 is a link from the terminal to a DN #4, and a serving link #5 is a link from the terminal to a DN #5.

TABLE 4

| Service identifier | Application server IP | Remaining capacity | Task processing efficiency | Task storage efficiency | Location | DNAI |
|---|---|---|---|---|---|---|
| SID #2 | IP #4 | 1000/100000 | 2 s | 1 s | DN #4 | DNAI #4 |
| SID #2 | IP #5 | 60/1000 | 1 s | 1 s | DN #5 | DNAI #5 |

TABLE 5

| | Bandwidth | Delay | Packet loss rate |
|---|---|---|---|
| Serving link #4 | 500M | 50 ms | 2% |
| Serving link #5 | 400M | 10 ms | 1% |

According to the foregoing formula #1, the first network element determines reference computing power of the application server #4 and reference computing power of the application server #5, and determines that the target application server is an application server with the largest reference computing power in the two application servers. It should be understood that, if the application server selection policy of the SID #2 is that resources are sufficient, a weight of the remaining capacity parameter in the formula #1 may be increased, for example, a value of the coefficient #1 is increased. Because a remaining capacity of the application server #4 is relatively large, the first network element calculates that the reference computing power of the application server #4 is the largest, and determines that the target application server is the application server #4.

It can be learned from the foregoing that, when selecting an application server for the terminal device, the first network element considers the characteristic parameter of the application server and the network status of the serving link, instead of selecting the application server only according to a proximity principle. Therefore, compared with an existing method, in the method in this application, resources in a network can be better used, and the selected target application server can better execute a service of the terminal device, to improve user experience.

The following further describes technical solutions of this application with reference to different cases.

First Case (where the First Network Element is a CSMF):

For this case, before S310, the method further includes the following steps.

S301: The SMF sends a third request message to the first network element. Correspondingly, the first network element receives the third request message from the SMF.

The third request message is used to request the first network element to select an application server for the terminal, and the third request message includes an identifier of the terminal. In other words, the third request message is used to request the first network element to select a computing capability.

In a manner, in a process of creating a protocol data unit (PDU) session for the terminal, after performing EASDF selection, the SMF may be triggered to send the third request message to the first network element.

S302: The first network element sends a second request message to a UDM. Correspondingly, the UDM receives the second request message.

The second request message is used to request service information related to the terminal, and the second request message includes the identifier of the terminal. Further, the second request message may be used to request service information related to the PDU session created for the terminal.

S303: The UDM sends a second response message to the first network element.

Correspondingly, the first network element receives the second response message from the UDM, where the second response message includes the identifier of the target service.

Optionally, the second response message further includes one or more of the following:

an application identifier associated with the target service, an identifier of an AF associated with the target service, a DNN of a DN associated with the target service, NSSAI of a network slice associated with the target service, and a domain associated with the target service.

In addition, for this case, an implementation in which the first network element obtains the second information in S320 may be as follows.

The first network element obtains, locally or from a UDR, a status of a network in the DN in which the candidate application server is located.

For example, statuses of networks in a plurality of DNs may be preconfigured in the first network element, and the first network element may determine, based on local configuration information, a status of a network in the DN in which the candidate application server is located.

For another example, statuses of networks in a plurality of DNs may be preconfigured in the UDR, and the first network element obtains, from the UDR, the status of the network in the DN in which the candidate application server is located.

It should be understood that an application provider may register the status of the network in the DN with the CSMF or the UDR through an NEF interface. An identifier may be an SID, and/or an application server IP, and/or a DNAI. Content may be a delay, and/or a bandwidth, and/or a packet loss rate, and the like.

In addition or alternatively, the first network element obtains the status of the network between the terminal and the RAN from the SMF; and/or the first network element obtains the status of the network between the RAN and the candidate UPF from the SMF. In a manner, the process may include the following steps.

Step A: The first network element sends a request message #A to the SMF. Correspondingly, the SMF receives the request message #A.

The request message #A is used to request the status of the network between the terminal and the RAN and/or the status of the network between the RAN and the candidate UPF. The request message #A includes the identifier of the terminal (for example, an IP of the terminal) and/or an identifier (for example, the DNAI) of the DN in which the candidate application server is located.

Step B: The SMF determines the UPF based on the identifier of the terminal in the request message #A. It should be understood that the UPF is a UPF accessed by the terminal.

Step C: The SMF obtains, from the UPF, the status of the network between the terminal and the RAN.

Step D: The SMF determines the candidate UPF based on the identifier that is in the message #A and that is of the DN in which the candidate application server is located.

Step E: The SMF obtains, from the candidate UPF, the status of the network between the RAN and the candidate UPF.

Optionally, in a manner, the SMF may send an identifier of the RAN to the candidate UPF, and the candidate UPF determines the status of the network between the RAN and the candidate UPF based on the identifier of the RAN, and feeds back the status of the network to the SMF.

Optionally, in another manner, the candidate UPF may periodically report the status of the network between the RAN and the candidate UPF.

For example, if the candidate UPF is the UPF #1, the UPF #2, and a UPF #3, the SMF may obtain the status of the network between the RAN and the UPF #1, the status of the network between the RAN and the UPF #2, and a status of a network between the RAN and the UPF #3.

Step F: The SMF sends a response message #A to the first network element, where the response message #A includes the status of the network between the terminal and the RAN and/or the status of the network between the RAN and the candidate UPF.

For this case, after S330, the method further includes the following steps.

S331: The first network element sends information #A to the SMF. Correspondingly, the SMF receives the information #A.

The information #A includes the identifier of the terminal, the identifier of the target service, and an identifier of the target application server. Optionally, the information #A may further include an identifier (for example, a DNAI) of a DN associated with the target service and/or a domain name of the domain associated with the target service.

S332: The SMF sends the information #A to the EASDF. Correspondingly, the EASDF receives the information #A.

In a manner, the SMF may send a domain name system context (DNS context) to the EASDF, and the information #A may be carried in the DNS context.

S333: The terminal sends a request message #B to the EASDF. Correspondingly, the EASDF receives the request message #B.

The request message #B requests an application server used to execute the target service. The request message #B includes the identifier of the target service. The request message #B may further include the domain name associated with the target service. Optionally, the identifier of the target service may be included in the domain name, or is not included in the domain name and is used as an independent parameter.

In a manner, the request message #B may be a DNS request message.

S334: The EASDF sends a response message #B to the terminal. Correspondingly, the terminal receives the response message #B. The response message #B includes the identifier of the target application server.

In a manner, the EASDF determines the target application server based on the information #A and the identifier of the target service that is included in the request message #B, and sends the identifier of the target application server (for example, an IP of the target application server) to the terminal.

Optionally, before S334, the EASDF may determine whether to trigger a notify operation. When the notify operation needs to be performed, the EASDF sends a notify operation request message to the SMF. The SMF determines, based on the notify operation request message, whether to insert an uplink classifier (UL CL)/branching point (BP) and a local PDU session anchor (L-PSA). If the UL CL/BP and the L-PSA need to be inserted, the SMF inserts the UL CL/BP and L-PSA need to be inserted. The SMF sends a notify operation response message to the EASDF.

Second Case (where the First Network Element is an SMF):

For this case, before S310, the method further includes S302 and S303. Details are not described herein.

Optionally, in a PDU session establishment process, after performing EASDF selection, the first network element may be triggered to send the second request message to the UDM.

In addition, for this case, an implementation in which the first network element obtains the second information in S320 may be as follows.

The first network element obtains, from the UDR, the status of the network in the DN in which the candidate application server is located; and/or the first network element may determine, based on the identifier of the terminal, a UPF currently associated with the terminal, and obtain the status of the network between the terminal and the RAN from the UPF; and/or the first network element may determine the candidate UPF based on an identifier (a DNAI) of the DN in which the candidate application server is located, and obtain the status of the network between the RAN and the candidate UPF from the candidate UPF.

For this case, after S330, the method further includes S332 to S334. Details are not described herein.

Third case (where the first network element is a CSMF):

For this case, before S310, the method further includes the following steps.

S304: The terminal sends a request message #B to the EASDF. Correspondingly, the EASDF receives the request message #B.

The request message #B requests an application server used to execute the target service. The request message #B includes the identifier of the target service. The request message #B may further include the domain name associated with the target service. Optionally, the identifier of the target service may be included in the domain name, or is not included in the domain name and is used as an independent parameter.

In a manner, the request message #B may be a DNS request message. In other words, S310 is performed after the terminal initiates a DNS request.

S305: The EASDF (an example of a third network element) sends the identifier of the target service to the first network element. Correspondingly, the first network element obtains the identifier of the target service from the EASDF.

It should be understood that the identifier of the target service may be carried in a third request message. In other words, in this case, the third request message includes the identifier of the terminal and the identifier of the target service. The third request message may further include the domain name associated with the target service.

In addition, for this case, an implementation in which the first network element obtains the second information in S320 is as follows.

The first network element obtains, locally or from the UDR, the status of the network in the DN in which the candidate application server is located. In addition or alternatively, the first network element obtains the status of the network between the terminal and the RAN from the SMF; and/or the first network element obtains the status of the network between the RAN and the candidate UPF from the SMF. For details, refer to the first case. Details are not described herein again.

The SMF is an SMF associated with the terminal. The first network element may send the identifier of the terminal to the UDM, and obtain, from the UDM, the SMF associated with the terminal.

For this case, after S330, the method further includes the following steps.

S331: The first network element sends information #A to the SMF. Correspondingly, the SMF receives the information #A.

Content included in the information #A is described above, and details are not described herein again.

In a manner, the first network element may send the information #A to the SMF by using the EASDF, for example, by using a notify interface of the EASDF.

S332: The SMF sends the information #A to the EASDF. Correspondingly, the EASDF receives the information #A.

In a manner, the SMF may send a domain name system context (DNS context) to the EASDF, and the information #A may be carried in the DNS context.

Optionally, before S332, the SMF may determine, based on the information #A, whether to insert a UL CL/BP and an L-PSA. If the UL CL/BP and the L-PSA need to be inserted, the SMF inserts the UL CL/BP and the L-PSA.

S334: The EASDF sends a response message #B to the terminal. Correspondingly, the terminal receives the response message #B. The response message #B includes an identifier of the target application server.

In a manner, the EASDF determines the target application server based on the information #A and the identifier of the target service that is included in the request message #B, and sends the identifier of the target application server (for example, an IP of the target application server) to the terminal.

Fourth Case (where the First Network Element is an SMF):

For this case, before S310, the method further includes S304 and S305. Details are not described herein again.

In addition, for this case, an implementation in which the first network element obtains the second information in S320 is the same as that in the second case.

For this case, after S330, the method further includes S332 and S334. Details are not described herein again. Optionally, before S332, the SMF may determine, based on the information #A, whether to insert a UL CL/BP and an L-PSA. If the UL CL/BP and the L-PSA need to be inserted, the SMF inserts the UL CL/BP and the L-PSA.

Fifth Case (where the First Network Element is a CSMF):

S306: The terminal sends a request message #B to a local domain name system (domain name system, DNS) server/resolver. Correspondingly, the local DNS server receives the request message #B.

The request message #B is used to request the application server that executes the target service. The request message #B includes the identifier of the target service. The request message #B may further include the domain name associated with the target service. Optionally, the identifier of the target service may be included in the domain name, or is not included in the domain name and is used as an independent parameter.

In a manner, the terminal may send the request message #B to the local DNS server by using a UL CL/BP and an L-PSA.

In a manner, the request message #B may be a DNS request message.

S307: The local DNS server (another example of a third network element) sends the identifier of the target service to the first network element. Correspondingly, the first network element receives the identifier of the target service from the local DNS server.

It should be understood that the identifier of the target service may be carried in a third request message. In other words, in this case, the third request message includes the identifier of the terminal and the identifier of the target service. The third request message further includes the domain name associated with the target service.

In addition, for this case, an implementation in which the first network element obtains the second information in S320 is the same as that in the third case. Details are not described herein again.

For this case, after S330, the method further includes the following steps.

S331: The first network element sends information #A to the SMF. Correspondingly, the SMF receives the information #A.

Content included in the information #A is described above, and details are not described herein again.

Optionally, the SMF may determine, based on the information #A, whether to insert the UL CL/BP and the L-PSA. If the UL CL/BP and the L-PSA need to be inserted, the SMF inserts the UL CL/BP and the L-PSA.

S335: The first network element sends the information #A to the local DNS server. Correspondingly, the local DNS server receives the information #A.

S336: The local DNS server sends a response message #B to the terminal. Correspondingly, the terminal receives the response message #B. The response message #B includes the identifier of the target application server.

In a manner, the local DNS server determines the target application server based on the information #A and the identifier of the target service that is included in the request message #B, and sends the identifier of the target application server (for example, an IP of the target application server) to the terminal.

Figure 4:
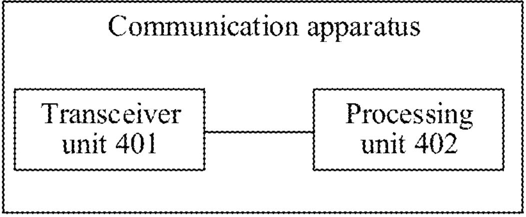
FIG. 4 is a block diagram of a communication apparatus according to this application.

According to the foregoing method, FIG. 4 shows a communication apparatus according to an embodiment of this application. The communication apparatus includes a transceiver unit 401 and a processing unit 402.

The transceiver unit 401 may be configured to implement a corresponding communication function. The transceiver unit 401 may also be referred to as a communication interface or a communication unit. The processing unit 402 may be configured to perform a processing operation.

Optionally, the apparatus further includes a storage unit. The storage unit may be configured to store instructions and/or data. The processing unit 402 may read the instructions and/or the data in the storage unit, so that the apparatus implements actions of the apparatus in the foregoing method embodiments.

In a design, the communication apparatus may be the first network element in the foregoing embodiment, or may be a component (for example, a chip) of the first network element.

The transceiver unit is configured to obtain a characteristic parameter of a candidate application server. The transceiver unit is further configured to obtain a network status of a serving link. The processing unit is configured to determine a target application server from the candidate application server based on the characteristic parameter of the candidate application server and the network status of the serving link.

In a case, the transceiver unit is further configured to send a first request message to a second network element; and the transceiver unit is further configured to receive a first response message from the second network element.

In a case, the transceiver unit is further configured to send a second request message to a data management network element; and the transceiver unit is further configured to receive a second response message from the data management network element.

In a case, the transceiver unit is further configured to receive a third request message from a session management network element.

In a case, the transceiver unit is further configured to obtain an identifier of a target service from a third network element.

In a case, the transceiver unit is further configured to obtain locally or from the second network element, a status of a network in a DN in which the candidate application server is located; and/or the transceiver unit is further configured to obtain a status of a network between a terminal and an access network device from the session management network element; and/or the transceiver unit is further configured to obtain a status of a network between the access network device and a candidate user plane function network element from the session management network element.

In a case, the transceiver unit is further configured to obtain a status of a network between the terminal and the access network device from a user plane function network element; and/or the transceiver unit is further configured to obtain a status of a network between the access network device and the candidate user plane function network element from the candidate user plane function network element.

It should be understood that a process in which the units perform the foregoing corresponding steps is described in detail in the foregoing method embodiments. For brevity, details are not described herein.

It should also be understood that the apparatus herein is presented in a form of a functional unit. The term "unit" herein may refer to an application-specific integrated circuit (ASIC), an electronic circuit, a processor (for example, a shared processor, a dedicated processor, or a group processor) configured to execute one or more software or firmware programs, a memory, a merged logic circuit, and/or another appropriate component that supports the described function. In an optional example, a person skilled in the art may understand that the apparatus may be the first network element in the foregoing embodiments, and may be configured to perform the procedures and/or steps corresponding to the first network element in the foregoing method embodiments. Alternatively, the apparatus may be the network management network element in the foregoing embodiments, and may be configured to perform the procedures and/or steps corresponding to the network management network element in the foregoing method embodiments. To avoid repetition, details are not described herein again.

The foregoing communication apparatus has a function of implementing corresponding steps performed by the apparatus in the foregoing method. The function may be implemented by hardware, or may be implemented by executing corresponding software by hardware. The hardware or software includes one or more modules corresponding to the foregoing function. For example, a transceiver unit may be replaced with a transceiver (for example, a sending unit in the transceiver unit may be replaced with a transmitter, and a receiving unit in the transceiver unit may be replaced with a receiver), and another unit such as a processing unit may be replaced with a processor, to separately perform sending and receiving operations and a related processing operation in the method embodiments.

In addition, the transceiver unit 401 may alternatively be a transceiver circuit (for example, the transceiver circuit may include a receiver circuit and a transmitter circuit), and the processing unit may be a processing circuit.

It should be noted that the apparatus in FIG. 4 may be the apparatus in the foregoing method embodiments, or may be a chip or a chip system, for example, a system-on-a-chip (SoC). The transceiver unit may be an input/output circuit or a communication interface. The processing unit is a processor, a microprocessor, or an integrated circuit integrated on the chip. This is not limited herein.

Figure 5:
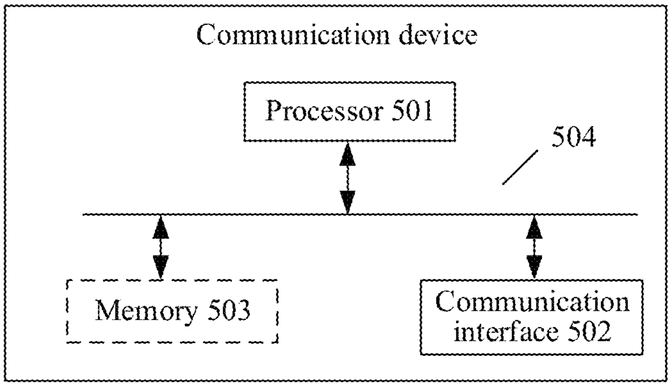
FIG. 5 is a block diagram of a communication device according to this application.

An embodiment of this application further provides a communication device. As shown in FIG. 5, the communication device includes a processor 501 and a communication interface 502. The processor 501 is configured to execute a computer program or instructions stored in a memory 503, or read data stored in a memory 503, to perform the methods in the foregoing method embodiments. Optionally, there are one or more processors 501. The communication interface 502 is configured to receive and/or send a signal. For example, the processor 501 is configured to control the communication interface 502 to send and/or receive a signal.

Optionally, as shown in FIG. 5, the communication device further includes a memory 503, and the memory 503 is configured to store a computer program or instructions and/or data. The memory 503 may be integrated with the processor 501, or may be disposed separately. Optionally, there are one or more memories 503.

Optionally, the processor 501, the communication interface 502, and the memory 503 are connected to each other by using a bus 504. The bus 504 may be a peripheral component interconnect (PCI) bus, an extended industry standard architecture (EISA) bus, or the like. The bus 504 may be classified into an address bus, a data bus, a control bus, and the like. For ease of representation, only one bold line is used for representation in FIG. 5, but this does not mean that there is only one bus or only one type of bus.

For example, the processor 501 is configured to execute the computer program or the instructions stored in the memory 503, to implement related operations of the first network element in the foregoing method embodiments.

It should be understood that a processor (such as the processor 501) mentioned in embodiments of this application may be a central processing unit (CPU), a network processor (NP), or a combination of a CPU and an NP. The processor may further include a hardware chip. The foregoing hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

It may be further understood that a memory (such as the memory 503) mentioned in embodiments of this application may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separate, and components displayed as units may or may not be physical units, in other words, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the method described in embodiments of this application. The storage medium includes any medium that can store program code, such as a USB flash drive, a removable hard disk, a read-only memory (ROM), a random access memory (RAM), a magnetic disk, or an optical disc.

The foregoing descriptions are merely implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for determining a target application server, the method comprising:

sending, by a first network element, a second request message to a data management network element, the second request message requesting service information related to a terminal, and the second request message comprising a terminal identifier of the terminal;

receiving, by the first network element, a second response message from the data management network element, the second response message comprising a target service identifier;

sending, by the first network element, a first request message to a second network element, the first request message comprising the target service identifier of the target service, the first request message requesting a characteristic parameter of a candidate application server capable of executing the target service;

receiving, by the first network element, a first response message from the second network element, the first response message comprising the characteristic parameter of the candidate application server, the candidate application server being capable of executing the target service of the terminal;

obtaining, by the first network element, a network status of a serving link, the serving link comprising a link from the terminal to a data network in which the candidate application server is located; and determining, by the first network element, based on the characteristic parameter and the network status of the serving link, the candidate application server comprises the target application server, the target application server being configured to execute the target service.

2. The method according to claim 1, wherein the characteristic parameter comprises a target application server identifier of the target application server, a target service identifier of a service capable of being executed by the target application server, and a data network access identifier of a data network in which the target application server is located.

3. The method according to claim 2, wherein the characteristic parameter further comprises one or more of:

a remaining capacity of the target application server, task processing efficiency of the target application server, task storage efficiency of the target application server, a data network name of the data network in which the target application server is located, an identifier of an application function network element associated with the target application server, a location of the target application server, a domain name of a domain to which the target application server belongs, and network slice selection assistance information of a network slice to which the target application server belongs.

4. The method according to claim 1, wherein the method further comprises:

receiving, by the first network element, a third request message from a session management network element, the third request message requesting the first network element select an application server for the terminal, and the third request message comprising the terminal identifier of the terminal.

5. The method according to claim 1, wherein the method further comprises:

obtaining, by the first network element, the target service identifier from a third network element, the third network element comprising an edge application server discovery network element or a domain name system server.

6. The method according to claim 1, wherein the network status of the serving link comprises:

a status of a network in the data network in which the candidate application server is located, and/or a status of a network between the terminal and an access network device, and/or a status of a network between the access network device and a candidate user plane function network element; and the candidate user plane function network element is associated with the data network in which the candidate application server is located.

7. The method according to claim 6, wherein the obtaining, by the first network element, the network status of the serving link comprises:

obtaining, by the first network element locally or from a second network element, the status of the network in the data network in which the candidate application server is located; and/or obtaining, by the first network element, the status of the network between the terminal and the access network device from a session management network element; and/or obtaining, by the first network element, the status of the network between the access network device and the candidate user plane function network element from the session management network element.

8. The method according to claim 7, wherein the method further comprises:

sending, by the first network element, a target application server identifier of the target application server, a terminal identifier of the terminal, and the target service identifier of the target service to the session management network element.

9. The method according to claim 6, wherein the obtaining, by the first network element, the network status of the serving link comprises:

obtaining, by the first network element, the status of the network between the terminal and the access network device from a user plane function network element accessed by the terminal; and/or obtaining, by the first network element, the status of the network between the access network device and the candidate user plane function network element from the candidate user plane function network element.

10. The method according to claim 9, wherein the method further comprises:

sending, by the first network element, a target application server identifier of the target application server, a terminal identifier of the terminal, and the target service identifier of the target service to an edge application server discovery network element.

11. A first network element, comprising:

a transceiver; and a processor connected to the transceiver;

the transceiver being configured to;

send a second request message to a data management network element, the second request message requesting service information related to a terminal, and the second request message comprising a terminal identifier of the terminal;

receive a second response message from the data management network element, the second response message comprising a target service identifier;

send a first request message to a second network element, the first request message comprising the target service identifier of the target service, the first request message requesting a characteristic parameter of a candidate application server capable of executing the target service;

receive a first response message from the second network element, the first response message comprising the characteristic parameter of the candidate application server, the candidate application server being capable of executing the target service of the terminal;

receive a network status of a serving link, the serving link comprising a link from the terminal to a data network in which the candidate application server is located; and the processor being configured to determine a target application server from the candidate application server based on the characteristic parameter of the candidate application server and the network status of the serving link, the target application server being configured to execute the target service.

12. The first network element according to claim 11, wherein the characteristic parameter comprises a target application server identifier of the target application server, a target service identifier of a target service capable of being executed by the target application server, and a data network access identifier of the data network in which the target application server is located.

13. The first network element according to claim 12, wherein the characteristic parameter further comprises one or more of:

a remaining capacity of the target application server, task processing efficiency of the target application server, task storage efficiency of the target application server, a data network name of the data network in which the target application server is located, an identifier of an application function network element associated with the target application server, a location of the target application server, a domain name of a domain to which the target application server belongs, and network slice selection assistance information of a network slice to which the target application server belongs.

14. The first network element according to claim 11, wherein the transceiver nit is further configured to receive a third request message from a session management network element, the third request message requesting the first network element to select an application server for the terminal, and the third request message comprising the terminal identifier of the terminal.

15. The first network element according to claim 11, wherein the transceiver is further configured to obtain the target service identifier of the target service from a third network element, the third network element comprising an edge application server discovery network element or a domain name system server.

16. The first network element according to claim 11, wherein the network status of the serving link comprises:

a status of a network in the data network in which the candidate application server is located, and/or a status of a network between the terminal and an access network device, and/or a status of a network between the access network device and a candidate user plane function network element; and the candidate user plane function network element is associated with the data network in which the candidate application server is located.

* * * * *